United States Patent
Schimmelpfeng et al.

(10) Patent No.: US 9,612,892 B2
(45) Date of Patent: Apr. 4, 2017

(54) CREATING A CORRELATION RULE DEFINING A RELATIONSHIP BETWEEN EVENT TYPES

(75) Inventors: Joern Schimmelpfeng, Herrenberg (DE); Frank Vosseler, Holzgerlingen (DE); Martin Bosler, Wannweil (DE)

(73) Assignee: Hewlett Packard Enterprise Development LP, Houston, TX (US)

( * ) Notice: Subject to any disclaimer, the term of this patent is extended or adjusted under 35 U.S.C. 154(b) by 111 days.

(21) Appl. No.: 14/008,940

(22) PCT Filed: Apr. 4, 2011

(86) PCT No.: PCT/US2011/031056
§ 371 (c)(1),
(2), (4) Date: Sep. 30, 2013

(87) PCT Pub. No.: WO2012/138319
PCT Pub. Date: Oct. 11, 2012

(65) Prior Publication Data
US 2014/0025998 A1    Jan. 23, 2014

(51) Int. Cl.
*G06F 11/00* (2006.01)
*G06F 11/07* (2006.01)
*H04L 12/24* (2006.01)

(52) U.S. Cl.
CPC ........ *G06F 11/0751* (2013.01); *G06F 11/079* (2013.01); *G06F 11/0709* (2013.01); *H04L 41/064* (2013.01); *H04L 41/065* (2013.01); *G06F 2201/86* (2013.01)

(58) Field of Classification Search
CPC ............ G06F 11/0751; G06F 11/0775; G06F 11/079; G06F 11/34; G06F 2201/86
See application file for complete search history.

(56) References Cited

U.S. PATENT DOCUMENTS

| | | | |
|---|---|---|---|
| 5,483,637 A * | 1/1996 | Winokur et al. | 714/26 |
| 6,154,849 A | 11/2000 | Xia | |
| 6,249,755 B1 | 6/2001 | Yemini et al. | |
| 6,446,136 B1 | 9/2002 | Pohlmann et al. | |
| 7,089,250 B2 * | 8/2006 | Doganata et al. | |
| 7,631,222 B2 * | 12/2009 | Hasan | H04L 41/0631 714/26 |
| 7,730,494 B1 * | 6/2010 | Rosenbluth et al. | 719/318 |
| 7,889,666 B1 | 2/2011 | Pei | |
| 8,069,374 B2 * | 11/2011 | Panigrahy et al. | 714/38.1 |
| 8,464,279 B2 * | 6/2013 | Gutjahr et al. | 719/318 |

(Continued)

FOREIGN PATENT DOCUMENTS

| | | |
|---|---|---|
| CN | 1332867 | 1/2002 |
| TW | 200821960 | 5/2008 |

OTHER PUBLICATIONS

European Patent Office, Extended European Search Report for Appl. No. 11863207.4 dated Jun. 2, 2015 (7 pages).

(Continued)

*Primary Examiner* — Joseph Kudirka
(74) *Attorney, Agent, or Firm* — Trop, Pruner & Hu, P.C.

(57) ABSTRACT

Plural clusters or occurrences of a pattern of event types are identified (304). Based on configuration items relating to events associated with the event types, a correlation rule is created (308) to define a relationship between the event types.

18 Claims, 4 Drawing Sheets

(56) References Cited

U.S. PATENT DOCUMENTS

| | | | |
|---|---|---|---|
| 8,751,417 B2* | 6/2014 | Watanabe | G06F 11/0709 370/311 |
| 8,984,337 B2* | 3/2015 | Sonoda | G06F 11/0709 714/26 |
| 9,021,304 B2* | 4/2015 | Tonouchi | 714/26 |
| 9,229,898 B2* | 1/2016 | Ramakrishnan | G06F 11/34 |
| 2005/0015217 A1 | 1/2005 | Weidl et al. | |
| 2005/0080806 A1 | 4/2005 | Doganata | |
| 2007/0266142 A1 | 11/2007 | Nastacio | |
| 2008/0103847 A1 | 5/2008 | Sayal | |
| 2008/0195369 A1* | 8/2008 | Duyanovich et al. | 703/22 |
| 2009/0177692 A1 | 7/2009 | Chagoly | |
| 2009/0183030 A1* | 7/2009 | Bethke et al. | 714/37 |
| 2010/0070981 A1 | 3/2010 | Hadar | |
| 2010/0131315 A1 | 5/2010 | Gilbert | |
| 2010/0223628 A1 | 9/2010 | Rosenbluth | |
| 2011/0055138 A1 | 3/2011 | Khanduja | |
| 2014/0006871 A1* | 1/2014 | Lakshmanan et al. | 714/37 |
| 2015/0033086 A1* | 1/2015 | Sasturkar et al. | 714/57 |

OTHER PUBLICATIONS

Korean Intellectual Property Office, International Search Report and Written Opinion for PCT/US2011/031056 dated Nov. 18, 2011 (9 pages).

The International Bureau of WIPO, International Preliminary Report on Patentability for PCT/US2011/031056 dated Oct. 17, 2013 (6 pages).

* cited by examiner

CREATING A CORRELATION RULE DEFINING A RELATIONSHIP BETWEEN EVENT TYPES

CROSS-REFERENCE TO RELATED APPLICATION

This application is a national stage application under 35 U.S.C. §371 of PCT/US2011/31056, filed Apr. 4, 2011.

BACKGROUND

An information technology (IT) infrastructure of an enterprise (e.g., a company, an educational organization, a government agency, etc.) can include a relatively large arrangement of components. IT administrators of the enterprise can be tasked with managing the IT infrastructure, including identifying root causes of issues that are detected, among other tasks. However, managing a relatively large IT infrastructure can be complex.

BRIEF DESCRIPTION OF THE DRAWINGS

Some embodiments are described with respect to the following figures.

DETAILED DESCRIPTION

An information technology (IT) infrastructure includes an arrangement of components, such as hardware components (e.g., computers, storage servers, communications devices, and so forth), software components (e.g., applications, operating systems, drivers, and so forth), database components (e.g., relational database management systems, unstructured database systems, and so forth), and/or other components. As part of the overall operation of the IT infrastructure, various events can occur, including events relating to problems, failures, issues, or activities relating to components in the IT infrastructure.

Traditionally, when presented with events relating to problems, failures, issues, or activities, IT administrators are assigned the task of identifying or determining the root causes of such events. However, for a relatively large IT infrastructure, manual determination of root causes of events can be time consuming and error prone.

In accordance with some implementations, mechanisms or techniques are provided to automatically create correlation rules that define relationships between respective two or more types of events. Using correlation rules, a system can automatically identify a correlation between event types such that the system can determine, for a given event, what other event(s) caused the given event. In this manner, root causes of events relating to problems, failures, issues, or activities can be efficiently and accurately identified.

A correlation rule can specify a type of a cause event that is the cause of a type of symptom event. More generally, a correlation rule can specify one or multiple types of cause events that are the cause of one or multiple types of symptom events. A cause event refers to an event that causes occurrence of another event. A symptom event is the event that results from occurrence of another event. An "event" can refer to a problem, a failure, an issue, an activity, an operation, an input, an output, or any other occurrence in an IT infrastructure. Events can be categorized into different types. For example, one type of event is a database going down. Another type of event is a mail server starting up. Yet another type of event is an application server exhibiting an error. There are numerous other examples of event types.

Figure 1:
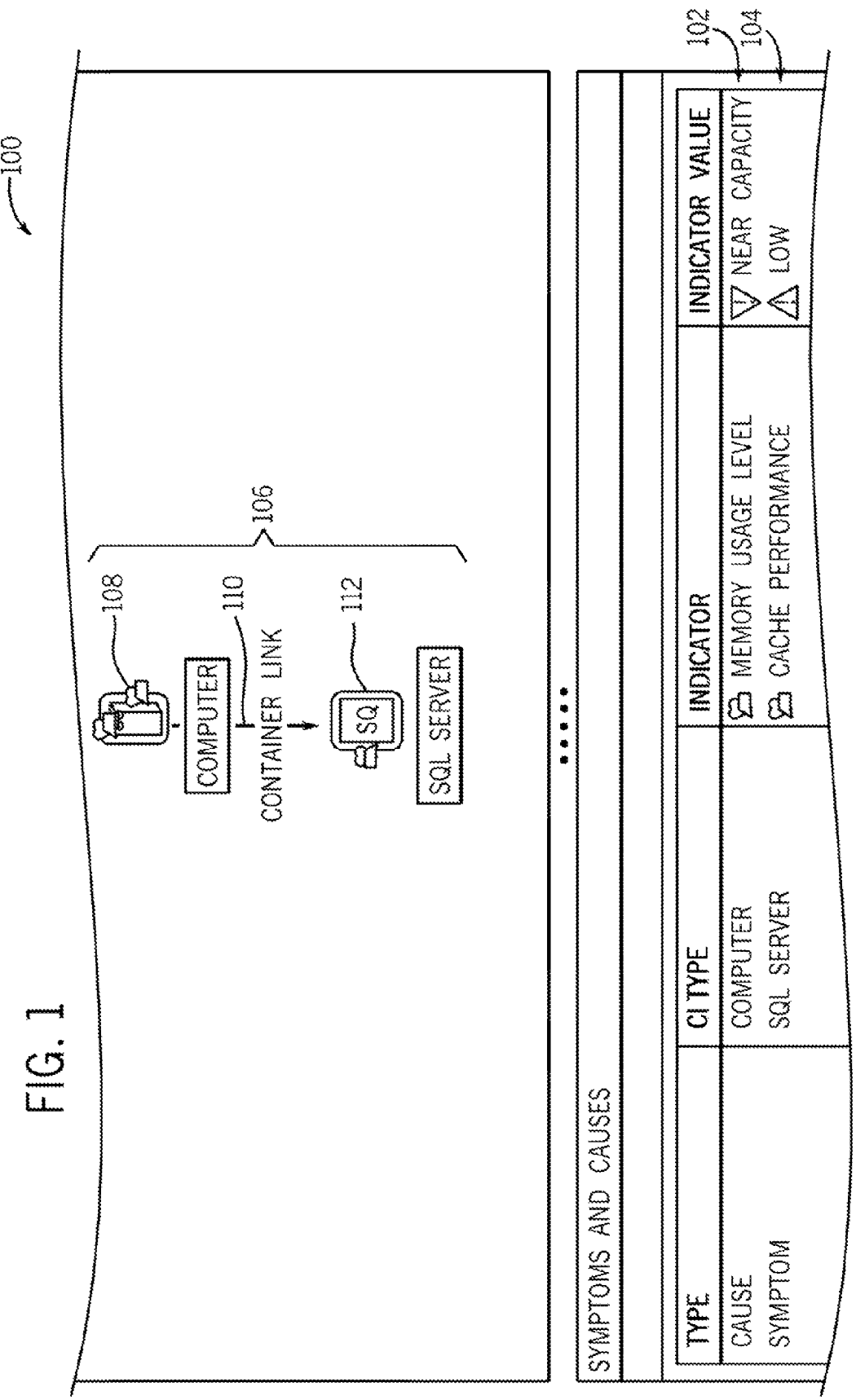
FIG. 1 illustrates an example correlation rule that is created using an event correlator according to some implementations.

An example of a correlation rule 100 is depicted in FIG. 1. The correlation rule 100 may be displayable in graphical form on a display device, for example. The correlation rule 100 includes an cause event type 102 (which in the FIG. 1 example is memory usage level—near capacity) that is the cause of a symptom event type 104 (which in the FIG. 1 example is cache performance—low). In the FIG. 1 example, the cause event type 102 is associated with a computer configuration item (CI), while the symptom event type 104 is associated with an SQL server configuration item. A configuration item defines a configuration of a component, such as a hardware component, a software component, a database component, or any other component of an IT infrastructure. A "configuration" can include an attribute associated with the component. Generally, a configuration item represents a discrete unit of a configuration relating to a component. A configuration item can be related to another configuration item (or multiple other configuration items).

FIG. 1 also shows a graphical representation 106 of a computer CI 108 that is linked by relationship 110 to the SQL server CI 112. In the example of FIG. 1, the relationship 110 is a container link, which indicates that the computer CI 108 contains the SQL server 112 (in other words, an SQL server is contained in a computer). The correlation rule 100 of FIG. 1 provides a correlation between event types 102 and 104, associates the event types 102, 104 with respective configuration items 108, 112, and identifies a relationship between the respective configuration items 108, 112. The association of the configuration items (and more specifically configuration item classes such as the computer CI class 108 and the SQL server class 112) with respective event types provides a topology constraint that has to be satisfied for corresponding event types to be considered related according to the correlation rule.

Although a specific example of a form of correlation rule is shown in FIG. 1, note that in other implementations, other forms of correlation rules can be used.

Based on information in the correlation rule 100, a particular event (such as memory usage level—near capacity represented by 102 in FIG. 1) that occurs on a computer (as represented by the computer CI in FIG. 1) is likely the cause of a symptom event (e.g., cache performance—low represented by 104 in FIG. 1) that occurs with an SQL server (as represented by SQL server CI 112 in FIG. 1).

Figure 2:
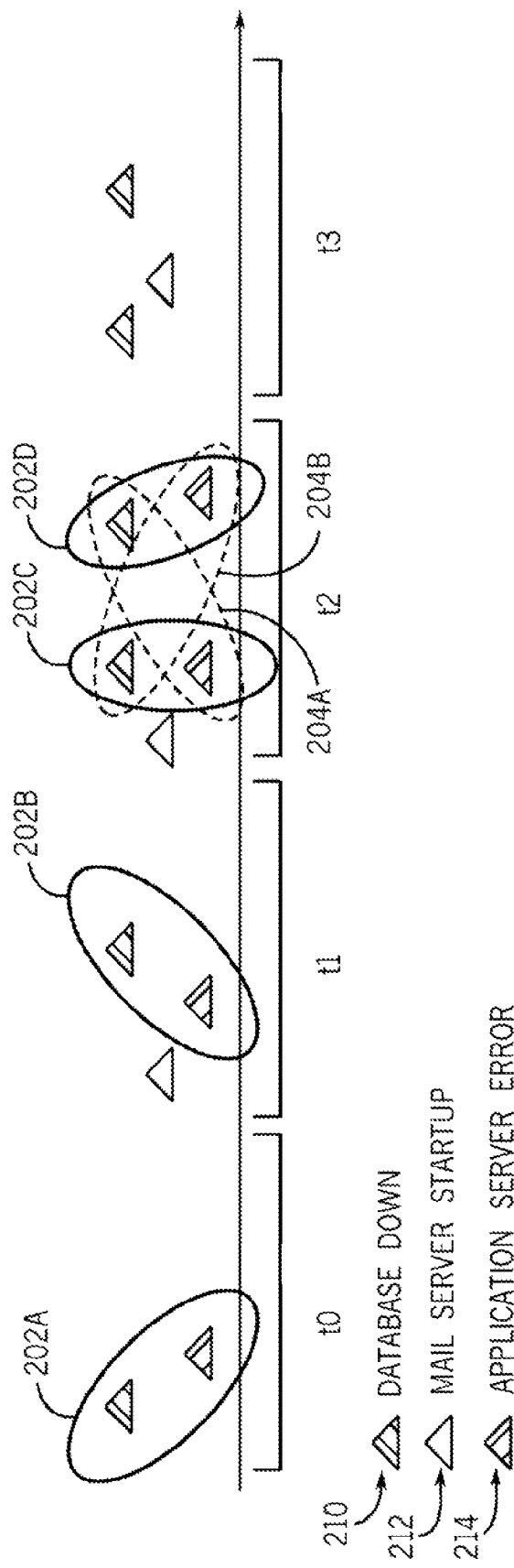
FIG. 2 is a timing diagram illustrating occurrences of events over time, which can be processed using an event correlator according to some implementations.

In accordance with some implementations, to automatically create correlation rules, a stream of events that have occurred can be analyzed. For example, FIG. 2 illustrates a timeline of events over time. In the example of FIG. 2, four time intervals (t0, t1, t2, and t3) are identified along the horizontal axis of the timeline. Events that occur in an IT infrastructure can be grouped into the respective time intervals. For example, as shown in FIG. 2, triangle symbols represent respective events that have occurred over time. In time interval t0, two events occurred; in time interval t1, three events occurred; in time interval t2, five events occurred; and in time interval t3, three events occurred. The triangle symbols have different fill patterns to represent different types of events, as represented by the legends 210, 212, and 214. A first type of event (210) is a database down event type, a second type of event (212) is a mail server startup event type, and a third type of event (214) is an application server error event type.

The number of events and the types of events illustrated in FIG. 2 are provided for purposes of example. In a relatively large IT infrastructure, there can be much larger numbers of events and of event types.

Although FIG. 2 depicts partitioning of events into time intervals, in other implementations, events can be partitioned into other types of partitions different from time intervals. Other partitions can include partitions of events occurring on different machines or groups of machines, partitions of events occurring within different divisions or departments of an enterprise, partitions of events occurring within different geographic regions, and so forth.

As shown in FIG. 2, a pattern of event types is present, namely a pattern that includes a database down event type and an application server error event type occurring relatively close in time to each other (e.g., within the same time interval). Each event is associated with event type information to allow mechanisms according to some implementations to determine the type of each of the events that have occurred. Additionally, an event can also be associated with a timestamp indicating when the event occurred, and information identifying an associated configuration item.

As depicted in FIG. 2, solid ovals 202A, 202B, 202C, and 202D represent respective occurrences of a particular pattern of event types (database down event type and application server error event type in the example of FIG. 2) that may be related to each other. Each occurrence of the pattern of event types is basically a cluster of potentially related event types that occur within a respective time interval.

Note that FIG. 2 also shows events of the mail server startup event type that are present in time intervals t1, t2, and t3. In the example of FIG. 2, the mail server startup events have been determined not to be related to the other event types shown in FIG. 2, and thus are not identified as being part of clusters of related event types. For example, the mail server startup event type can be identified as noise, for various reasons. The event correlator may determine that the mail server startup event type occurs so frequently (occurs in more than some predefined percentage of time intervals) that the mail server startup event type is considered noise and thus should not be correlated to other event types. The event correlator can thus detect that the relationship of noisy event types (event types that occur more frequently than some predefined threshold) and other event types are trivial and thus should not be considered to be correlated. Alternatively, or additionally, the event correlator may determine that prior occurrences of the mail server startup event type were not correlated to either the database down event type or the application server error event type, because a deeper analysis of information associated with these event types indicates that there exists no relationship between the mail server startup event type and the other event types.

Although just one pattern of event types (represented by the clusters 202A-202D) is shown in FIG. 2, note that there can be multiple patterns of event types in other examples.

Figure 3:
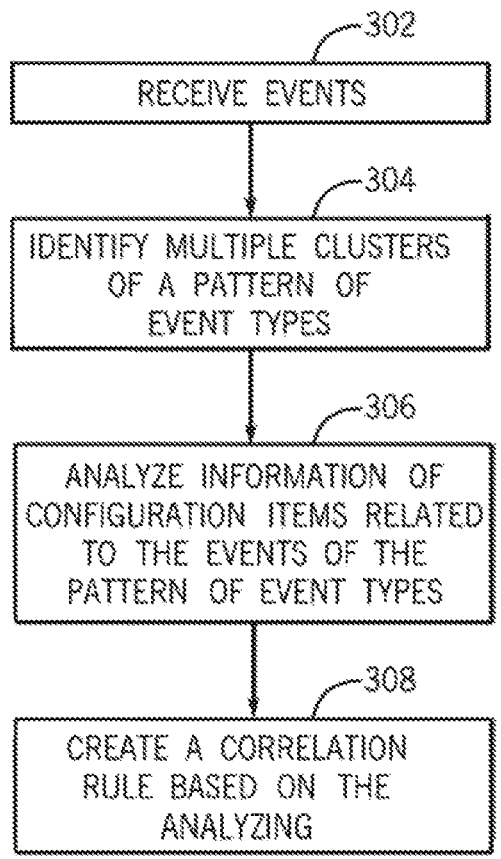
FIGS. 3 and 4 are flow diagrams of processes performed by an event correlator according to some implementations.

FIG. 3 is a flow diagram of a process according to some implementations for creating a correlation rule. The process of FIG. 3 can be performed by an event correlator, discussed further below. Events are received (at 302) over time, such as the events depicted in the timeline of FIG. 2. The received events can be part of an archive or other collection of events that have occurred.

The event correlator according to some implementations identifies (at 304) multiple occurrences (clusters) of a pattern of event types in the received events. The event correlator can invoke a clustering technique to cluster sets of events that are likely to be related because they frequently occur together or occur within a particular timeframe. The type property of the events can be used to group the events into multiple clusters of event types (e.g., clusters 202A-202D in multiple time intervals as shown in FIG. 2).

The event correlator then analyzes (at 306) Information associated with configuration items related to the events of the pattern of event types. A correlation rule is then created (at 308) defining a relationship between the event types in response to the analyzing determining a relationship between the corresponding configuration items.

Figure 4:
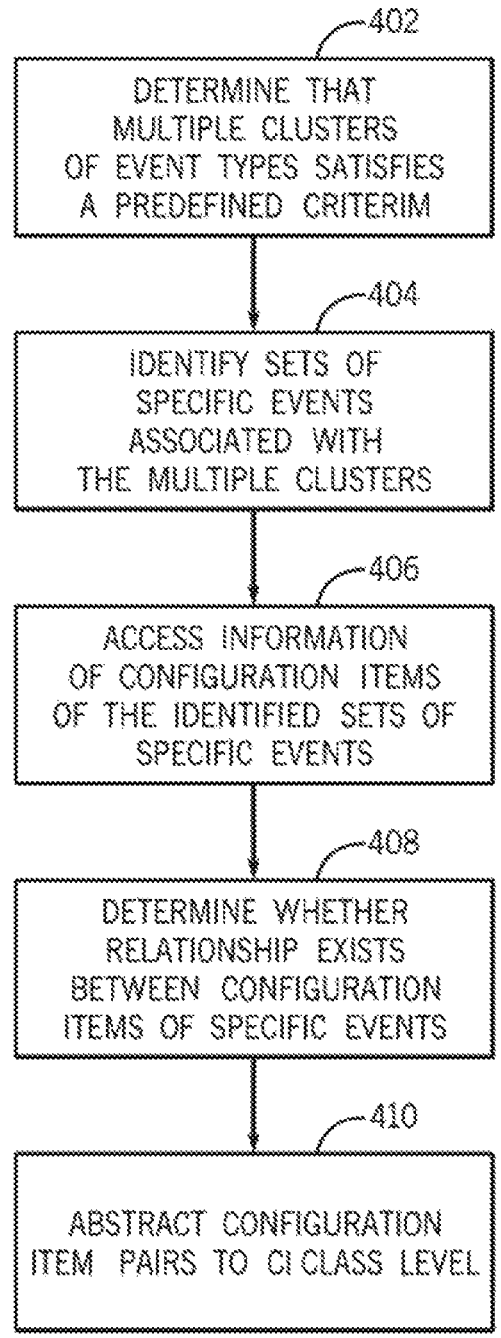

FIG. 4 illustrates further details of the analyzing performed at 306. In FIG. 4, the event correlator determines (at 402) that multiple occurrences of a pattern of event types, which in the example of FIG. 2 includes a pattern of a database down event type and an application server error event type, satisfies a predefined criterion. A single occurrence or a relatively small number of occurrences of a particular pattern of event types is unlikely to signify that there is a relationship between the event types. However, if the number of the multiple occurrences of the pattern of event types or a rate of occurrence of the pattern of event types exceeds a predefined threshold, then that can be an indication that the event types of the pattern are related to each other. In such example, the "predefined criterion" includes the number of occurrences of the pattern or the rate of occurrence of the pattern exceeding the predefined threshold. In other examples, the "predefined criterion" can be another criterion.

The correlation rule creating task (308) of FIG. 3 is performed in response to the event correlator determining that the multiple occurrences of the pattern satisfy the predefined criterion. If the multiple occurrences of the pattern do not satisfy the predefined criterion, then the event correlator would not perform the correlation rule creating task (308) of FIG. 3.

For each cluster of event types, the event correlator identifies (at 404) a set (e.g. pair) of specific events relating to the cluster of event types. Note that it is the specific events that are associated with configuration items, such that the identifying of the sets of specific events allows for information of the associated configuration items to be accessed (at 406). In the example of FIG. 2 involving "database down" events and "application server error" events, each "database down" event can be associated with an instance of a database CI, and each "application server error" event can be associated with an instance of an application server CI.

The event correlator next determines (at 408) whether the configuration items to which the specific events are associated are actually related. For example, a shortest-path search can be performed for the configuration items of the specific events in each event pair (of specific events). The shortest-path search algorithm disqualifies the respective event pair if there is no path between the associated configuration items within a predefined number (zero or greater) of hops. In other examples, other techniques for determining whether relationships exist between configuration items can be used.

More generally, whether a relationship between configuration items exists can be determined (validated) based on accessing an information repository that describes relationships between configuration items. For example, the information repository can be a topology database that identifies topological relationships among configuration items. The topology database can be in the form of a graph having nodes corresponding to respective configuration items, and links that define relationships between the configuration items. The nodes of the topological graph can be directly linked, or indirectly linked through other nodes. Two nodes that are directly linked to each other means that the respective configuration items are connected to each other over a path of one hop. A configuration item is linked to itself by zero hops. If a first node is connected to a second node through a third node, then the respective configuration items associated with the first and second nodes are considered to be connected to each other over a path having one hop. More generally, a pair of configuration items are connected to each other over n hops (n≥1) if there are n−1 nodes between the nodes corresponding to the pair of configuration items.

In other implementations, the information repository can include a semantic database, which contains information defining relationships between configuration items.

Time interval t2 in FIG. 2 illustrates another particular issue that can be addressed as part of the analysis (306). If multiple instances of an analyzed pattern of event types occur in a short time interval (such as within t2), it is not clear which of the associated events are related. Such issue can be addressed by creating candidate pairs for all possible event combinations, with those candidates disqualified if the respective configuration items are not related. In the example of FIG. 2, dashed ovals 204A and 204B of the "database down" and "application server error" event pairs are disqualified because the associated configuration items are not related.

In the example of FIG. 2, four pairs of specific events have been identified (each pair including a database down event and an application server error event). Each pair of events is related to a particular instance of a database CI and application server CI and a path between the two CI instances.

Next, distinct CI instance pairs are abstracted (at 410) (with their path relationships) to the CI class level. Each instance of a configuration item has a class property, which defines the class of the configuration item. A correlation rule created using techniques according to some embodiments relates classes of configuration items, rather than specific instances of configuration items.

As part of the abstraction, the topology of the relationship between the configuration items associated with the related event types is also determined. For example, the related event types may be associated with configuration items having a containment relationship (one configuration item contains another), or alternatively, it is determined that one configuration item is related to another configuration item through an intermediate object. Such determination can allow the created correlation rule to specify the topological relationship between the configuration ire classes. The completed correlation rule includes information identifying the correlated event types and information describing the related configuration item classes (along with their topological relationship), such as in the form of graph 106 shown in FIG. 1. Inclusion of the information relating to the related configuration item classes allows for topology constraints to be included in the correlation rule. Such topology constraints of a correlation rule can be validated by looking at configuration item types and relationships between configuration item types when determining whether event types are related.

Techniques or mechanisms according to some implementations can also address user concerns about losing control of a system. To gain acceptance by IT personnel, the rule generation can be embedded in a rule-authoring tool. Instead of automatically injecting correlation rules without review by users, proposed correlation rules can be presented to a user, who can choose to accept the correlation rule as is, reject the proposed correlation rule, or modify and/or annotate the proposed correlation rule.

Figure 5:
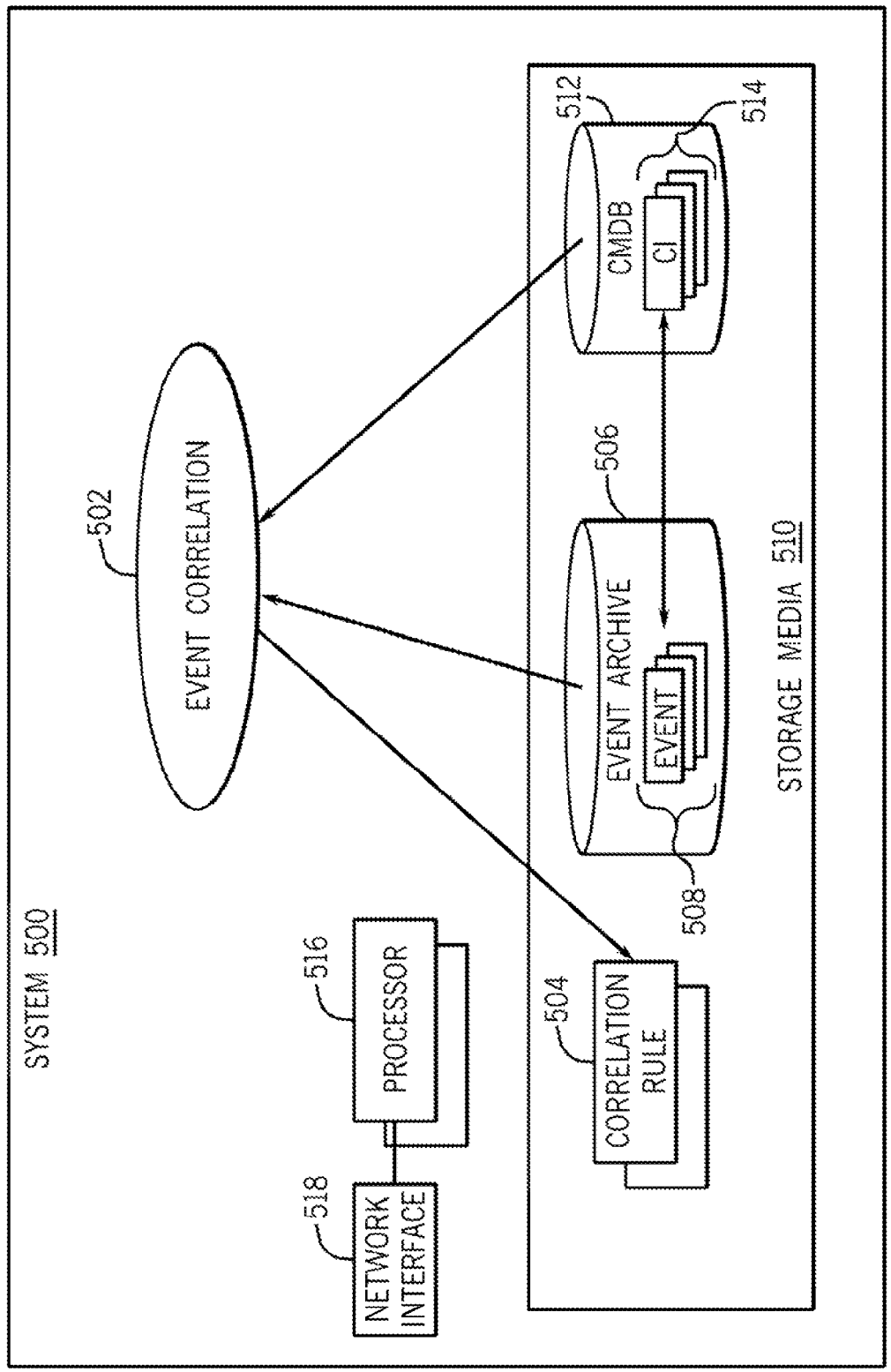
FIG. 5 is a block diagram of an example system incorporating an event correlator according to some implementations.

FIG. 5 is a block diagram of an example system 500 that includes an event correlator 502 according to some implementations, where the event correlator 502 is configured to automatically create correlation rules 504 based on information captured in an event archive 506 and CI information 514 in a database 512 (e.g., configuration management database or CMDB). The event archive 506 includes events 508 that have occurred over the life (or some predefined time interval) of an IT infrastructure. The CMDB 512 contains configuration items that represent respective components of an IT infrastructure.

The events 508 contained in the event archive 506 can include various types of information, such as a problem description or other description associated with each event, information relating to users, a timestamp, a type property, and information regarding an associated CI. The type property associated with information relating to an event provides information regarding the type of event.

The event archive 506, database 512, and any correlation rules 504 created by the event correlator 502, are stored in storage media 510, which can be implemented with one or multiple storage devices such as a disk-based storage device, integrated circuit storage device, and/or other type of storage device.

The system 500 also includes one or multiple processors 516. The event correlator 502 is executable on the processor(s) 516. Moreover, the system 500 includes a network interface 518 to allow the system 500 to communicate over a data network with remote systems, such as systems that produced the events for storing in the event archive 506.

Although the event archive 506 and CMDB 512 are stored in the storage media of the system 500, it is noted that in alternative examples, the event archive 506 and/or CMDB 512 can be stored on a remote, storage subsystem (or multiple remote storage subsystems).

By being able to automatically create correlation rules 504, domain expertise expected of IT administrators or other users can be reduced for the purpose of identifying root causes of events. By being able to automatically create correlation rules 504 that can assist in automatically determining causes of symptom events, improved efficiency and reduced cost in managing IT infrastructure can be accomplished.

Machine-readable instructions of the event correlator 502 are loaded for execution on the processor(s) 516. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
by a system having a processor:
receiving events that occurred in an infrastructure technology (IT) infrastructure comprising hardware components;
identifying a specific occurrence of a pattern of event types in the received events, the pattern of event types including a first event type and a second event type;
identifying a first configuration item (CI) associated with the first event type and a second CI associated with the second event type;
validating that a relationship exists between the first CI and the second CI;
abstracting the first CI and the second CI to a CI class level by:
identifying a first CI class associated with the first event type according to a class property of the first CI; and
identifying a second CI class associated with the second event type according to a class property of the second CI; and
creating a correlation rule correlating the first event type to the second event type based on the validated relationship that exists between the first CI associated with the first event type and the second CI associated with the second event type, wherein the correlation rule relates the first CI class to the second CI class; and
determining, using the correlation rule, a cause of a symptom event in the IT infrastructure.

2. The method of claim 1, wherein validating that the relationship exists between the first CI and the second CI comprises:
accessing an information repository that describes relationships between configuration items.

3. The method of claim 1, wherein validating that the relationship exists between the first CI and the second CI comprises:

accessing a topology graph of configuration items that represents configuration items as nodes and defines relationships between the configurations items through links between the nodes; and
validating the relationship exists between the first CI and the second CI responsive to determining there are less than a threshold number of hops between a node representing the first CI and a node representing the second CI.

4. The method of claim 1, wherein validating that the relationship exists between the first CI and the second CI comprises:
accessing a semantics database defining relationships between configuration items.

5. The method of claim 1, further comprising:
determining a topology of the relationship between the first CI and the second CI; and
specifying the determined topology as part of the correlation rule.

6. The method of claim 5, wherein the topology comprises:
a containment relationship indicating the first CI contains the second CI; or
an intermediate object relationship indicating the first CI is related to the second CI through an intermediate object.

7. A system comprising:
a storage medium to store a collection of events that have occurred within an information technology (IT) infrastructure comprising hardware components; and
a processor to:
identify plural occurrences of a particular pattern of event types occurring in the collection of events, the pattern of event types including an event pair of a first specific event of a first event type and a second specific event of a second event type;
identify an instance of a configuration item (CI) associated with the first specific event of the first event type;
identify an instance of a CI associated with the second specific event of the second event type;
abstract the first CI and the second CI to a CI class level through:
identification of a first CI class associated with the first event type according to a class property of the first CI; and
identification of a second CI class associated with the second event type according to a class property of the second CI; and
determine whether a relationship exists between the first CI class associated with the first specific event and the second CI class associated with the second specific event;
when the relationship exists:
create a correlation rule correlating the first event type associated with the first CI class and the second event type associated with the second CI class; and
determine, using the correlation rule, a cause of a symptom event in the IT infrastructure; and
when the relationship does not exist:
determine not to correlate the first event type and the second event type.

8. The system of claim 7, wherein the processor is further to:
determine a topology relationship between the first CI class and the second CI class; and specify the topology relationship as part of the correlation rule.

9. The system of claim 8, wherein the topology relationship comprises:
   a containment relationship indicating the first CI class contains the second CI class; or
   an intermediate object relationship indicating the first CI class is related to the second CI class through an intermediate object.

10. The system of claim 7, wherein the processor is to determine whether the relationship exists by:
   accessing a topology graph of configuration items that represents configuration items as nodes and defines relationships between the configurations items through links between the nodes; and
   determining the relationship exists responsive to determining there are less than a threshold number of hops between a node representing the instance of the CI associated with the first specific event and a node representing the instance of the CI associated with the second specific event.

11. The system of claim 10, wherein the processor is to determine whether the relationship exists further by:
   determining the relationship does not exist responsive to determining there is no path between the node representing the instance of the CI associated with the first specific event and the node representing the instance of the CI associated with the second specific event with a path length that is less than a predefined number of hops.

12. The system of claim 7, wherein the processor is to determine whether the relationship exists by:
   accessing a topology graph of configuration items that represents configuration items as nodes and defines relationships between the configurations items through links between the nodes;
   determining the relationship exists responsive to determining a path in the topology graph exists between a node representing the instance of the CI associated with the first specific event and a node representing the instance of the CI associated with the second specific event; and
   determining the relationship does not exist responsive to determining no path exists between the node representing the instance of the CI associated with the first specific event and the node representing the instance of the CI associated with the second specific event.

13. A non-transitory machine-readable storage medium comprising instructions executable by a processor to:
   access a collection of events that have occurred in an information technology (IT) infrastructure comprising hardware components;
   determine that plural occurrences of a particular pattern of event types are present in the collection of events, the particular pattern of event types including an event pair of a first specific event of a first event type and a second specific event of a second event type; and
   determine that the number of the plural occurrences exceed a predefined threshold, and in response, create a correlation rule correlating the first event type and the second event type by:
      identifying configuration item (CI) pairs among the plural occurrences, each CI pair including a first configuration item associated with a specific event of the first event type and a second configuration item associated with a specific event of the second event type;
      abstract each of the CI pairs to a CI class level through:
         identification of a first CI class associated with the first event type from a first CI of the CI pair; and
         identification of a second CI class associated with the second event type from a second CI of the CI pair;
      validating, for each identified CI pair, that a relationship exists between the first configuration item and the second configuration item of the identified CI pair; and
      creating the correlation rule responsive to validating that the relationships exist for the identified CI pairs, wherein the correlation rule specifies a relationship between the first event type associated with the first CI class and the second event type associated with the second CI class.

14. The non-transitory machine-readable medium of claim 13, wherein the instructions are executable by the processor to validate, for each identified CI pair, that a relationship exists between the first configuration item and the second configuration item of the identified CI pair by:
   accessing a topology graph of configuration items that represents configuration items as nodes and defines relationships between the configurations items through links between the nodes; and
   validating the relationship exists by determining a path in the topology graph exists between a node representing the first configuration item and a node representing the second configuration item.

15. The non-transitory machine-readable medium of claim 14, wherein the instructions are executable by the processor to further to validate the relationship exists by determining the path in the topology graph between the node representing the first configuration item and the node representing the second configuration item has a path length of less than a threshold number of hops.

16. The non-transitory machine-readable medium of claim 13, wherein the instructions are executable by the processor further to:
   determine a topology relationship between the first CI class and the second CI class; and
   specify the topology relationship as part of the correlation rule.

17. The non-transitory machine-readable medium of claim 16, wherein the topology relationship comprises:
   a containment relationship indicating the first CI class contains the second CI class; or
   an intermediate object relationship indicating the first CI class is related to the second CI class through an intermediate object.

18. The non-transitory machine-readable medium of claim 13, wherein the instructions are executable by the processor to validate, for each identified CI pair, that a relationship exists between the first configuration item and the second configuration item of the identified CI pair by accessing a semantics database defining relationships between configuration items.

* * * * *